United States Patent [19]

Marchini

[11] Patent Number: 5,048,329
[45] Date of Patent: Sep. 17, 1991

[54] HYDRAULIC VALVE TEST DEVICE

[75] Inventor: Guiseppe A. Marchini, North Clinton, Iowa

[73] Assignee: Commonwealth Edison Company, Chicago, Ill.

[21] Appl. No.: 573,644

[22] Filed: Aug. 27, 1990

[51] Int. Cl.⁵ .................................... G01M 19/00
[52] U.S. Cl. ........................................ 73/168; 73/37
[58] Field of Search ............... 73/168, 37, 4 R, 40, 73/46

[56] References Cited

U.S. PATENT DOCUMENTS

| | | | |
|---|---|---|---|
| 1,958,698 | 5/1934 | Fox | 73/168 |
| 2,569,299 | 9/1951 | Fegel | 73/4 R |
| 2,782,637 | 2/1957 | Scheldorf | 73/168 |
| 2,924,971 | 2/1960 | Schroeder et al. | 73/37 |
| 3,098,382 | 7/1963 | Hoffman et al. | 73/168 |
| 3,270,557 | 9/1966 | McClocklin | 73/168 |
| 3,557,602 | 1/1971 | Frantz | 73/4 R |
| 4,131,010 | 12/1978 | Eyres | 73/168 |
| 4,274,438 | 6/1981 | La Coste | 73/9 |
| 4,294,109 | 10/1981 | Peters et al. | 73/168 |
| 4,368,638 | 1/1983 | Groves et al. | 73/168 |
| 4,387,591 | 6/1983 | Corzine et al. | 73/168 |
| 4,430,886 | 2/1984 | Rood | 73/168 |
| 4,542,649 | 9/1985 | Charbonneau et al. | 73/168 |
| 4,566,310 | 1/1986 | Cohen et al. | 73/168 |
| 4,587,836 | 5/1986 | Hewlett | 73/46 |
| 4,598,579 | 7/1986 | Cummings et al. | 73/168 |
| 4,646,556 | 3/1987 | Courcoux et al. | 73/4 R |
| 4,682,491 | 7/1987 | Pickard | 73/37 |
| 4,722,221 | 2/1988 | Ferguson | 73/168 |
| 4,854,165 | 8/1989 | Jay | 73/168 |
| 4,903,529 | 2/1990 | Hodge | 73/168 |

Primary Examiner—Allan N. Shoap
Assistant Examiner—Diego F. F. Gutierrez
Attorney, Agent, or Firm—Emrich & Dithmar

[57] ABSTRACT

Apparatus for testing a solenoid-actuated, hydraulic valve under actual operating conditions in a closed hydraulic system includes two pressure gauges to monitor valve switching pressure as well as electrical control switches and a test lead to power the valve. A closed hydraulic system includes a reservoir, a pump and a needle valve for controlling pressure. With the hydraulic valve de-energized, flow of the hydraulic fluid is in a first direction, with a first pressure gauge indicating the internal hydraulic pressure and a second hydraulic gauge indicating zero pressure. When the valve is energized, fluid flow direction is reversed in the system and the second hydraulic gauge now measures a pressure, with the first hydraulic gauge indicating zero pressure. Operation of the electrically actuated hydraulic valve can be tested under actual operating conditions prior to installation in a hydraulic control system. The apparatus includes means for permitting various sizes and configurations of hydraulic solenoid valves to be tested.

12 Claims, 3 Drawing Sheets

HYDRAULIC VALVE TEST DEVICE

BACKGROUND OF THE INVENTION

This invention relates generally to hydraulic valves and particularly directed to the testing of solenoid-actuated hydraulic valves.

Closed hydraulic control systems include hydraulic valves, or switches, for controlling the flow of hydraulic fluid within the system. These hydraulic valves typically include a solenoid and are responsive to electrical signals for opening and closing of the valve. Each valve is rated to withstand a specified pressure. It is desirable to verify operation of the hydraulic valve up to this specified pressure under operating conditions prior to installation in the hydraulic control system. U.S. Pat. No. 4,854,165 to Jay discloses apparatus for testing an electrical switch responsive to fluid under pressure, wherein the testing apparatus simulates current loads experienced by the switch during operation. The testing apparatus also includes a meter communicating with the flow of fluid under pressure indicating whether a solenoid valve is operating properly. This apparatus is not a stand-alone device in that it requires a source of hydraulic fluid and a pressure source.

U.S. Pat. No. 4,903,529 to Hodge discloses an arrangement for testing a hydraulic device of a hydraulic control system by disconnecting the device from the control system and connecting it to a valve system analyzer which applies hydraulic fluid under pressure to the device. The fluid under pressure is monitored to evaluate operation of the device. This approach allows for testing the components of a hydraulic control system without removal from the system such as during scheduled shut-down periods. As such, this approach does not provide for testing and verification of proper operation of a hydraulic device under operating conditions prior to installation in the hydraulic control system.

The present invention addresses the aforementioned limitations of the prior art by providing apparatus for the complete testing of a hydraulic valve under operating conditions prior to installation in a hydraulic control system. A solenoid-actuated hydraulic valve is tested while energized, or open, so that fluid flow is in a first direction in the apparatus, and while deactivated, or closed, with fluid flow in a second, opposite direction. Pressure is easily and accurately measured by a pair of pressure gauges disposed adjacent to and on respective sides of a manually setable needle valve set at the hydraulic valve's rating.

OBJECTS AND SUMMARY OF THE INVENTION

Accordingly, it is an object of the present invention to test the operation under pressure of a solenoid-actuated, hydraulic valve.

It is another object of the present invention to test a hydraulic valve under actual operating conditions prior to installation in a hydraulic control system.

Yet another object of the present invention is to provide for highly accurate testing of hydraulic valves prior to installation in a hydraulic control system to reduce the possibility of valve malfunction following installation in the system and system downtime.

A further object of the present invention is to provide a compact, portable hydraulic valve test device capable of accurately testing hydraulic valves of various sizes and configurations.

The present invention contemplates apparatus for testing an electrically actuated hydraulic valve, wherein the hydraulic valve is open when energized and closed when de-energized, the apparatus comprising: a closed hydraulic system coupled to the hydraulic valve and including first and second ports and a pump for maintaining a hydraulic fluid under pressure; valve means coupling the first and second ports for providing a pressure drop in the hydraulic fluid between the ports; first and second pressure gauges coupled between the first port and the valve means and between the second port and the valve means, respectively, wherein hydraulic fluid flows in a first direction and the first pressure gauge indicates the hydraulic fluid pressure applied to the hydraulic valve when the hydraulic valve is de-energized and the second gauge indicates zero pressure; and electrical means coupled to the hydraulic valve for energizing the hydraulic valve whereupon the hydraulic fluid flows in a second, opposed direction and the first pressure gauge indicates zero pressure and the second pressure gauge indicates the hydraulic fluid pressure applied to the hydraulic valve.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
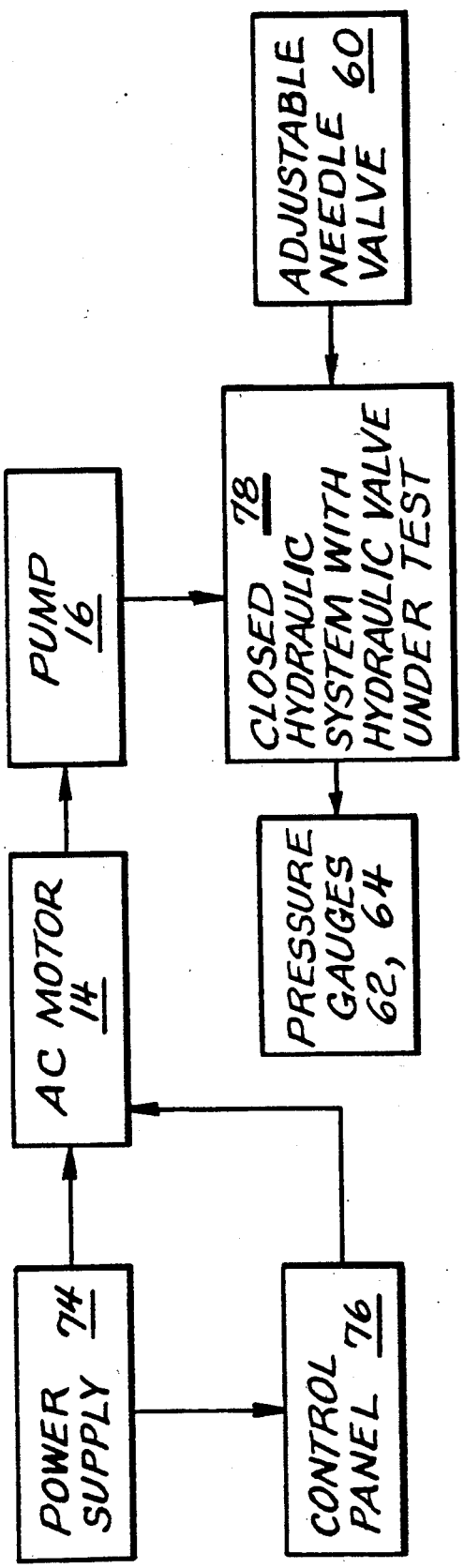
FIG. 1 is a simplified block diagram of a hydraulic valve test device in accordance with the principles of the present invention.
Figure 2:
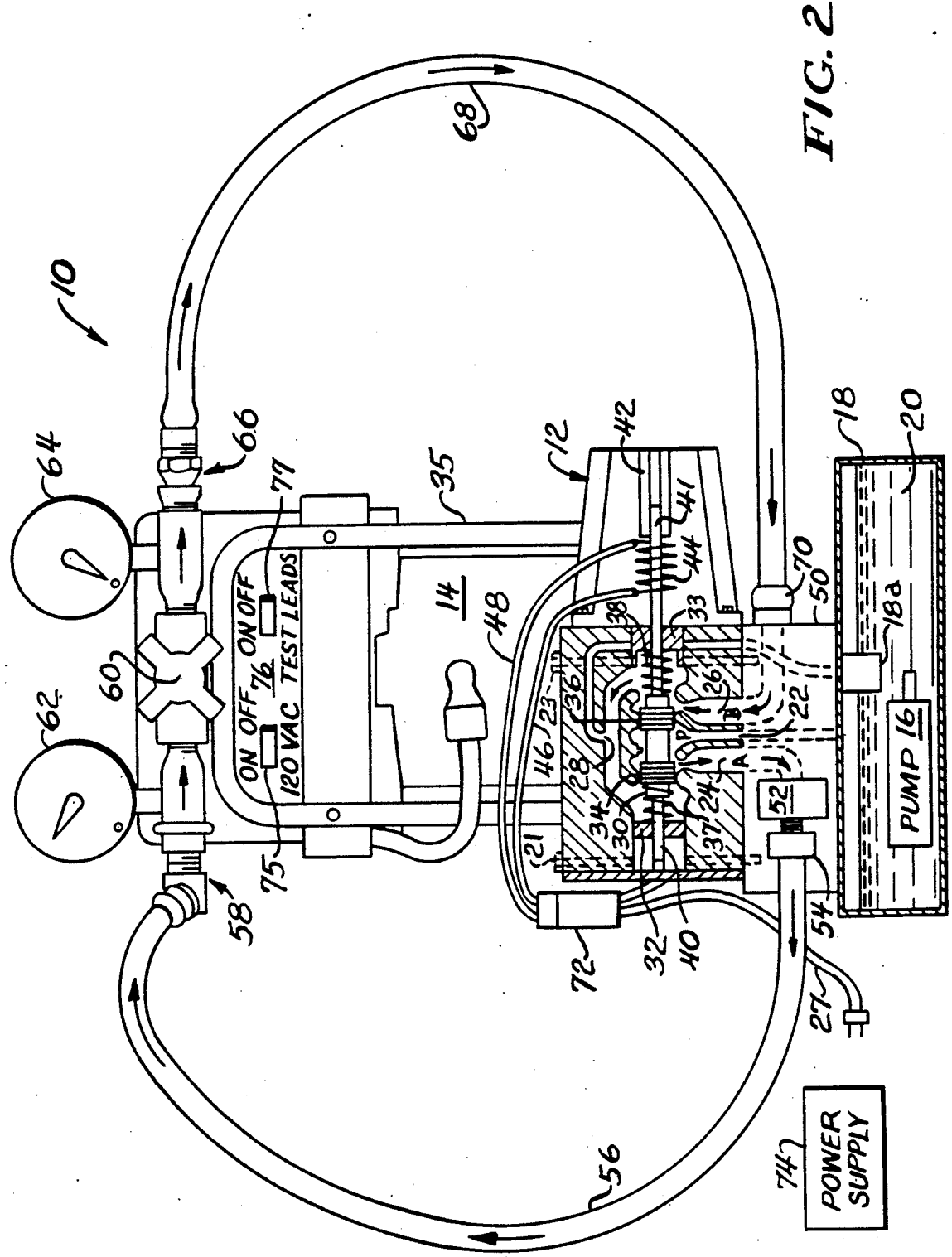
FIG. 2 is a simplified schematic diagram shown partially in phantom and partially cutaway of a hydraulic valve test device in accordance with the present invention with the hydraulic valve in the de-energized, or closed, state.
Figure 3:
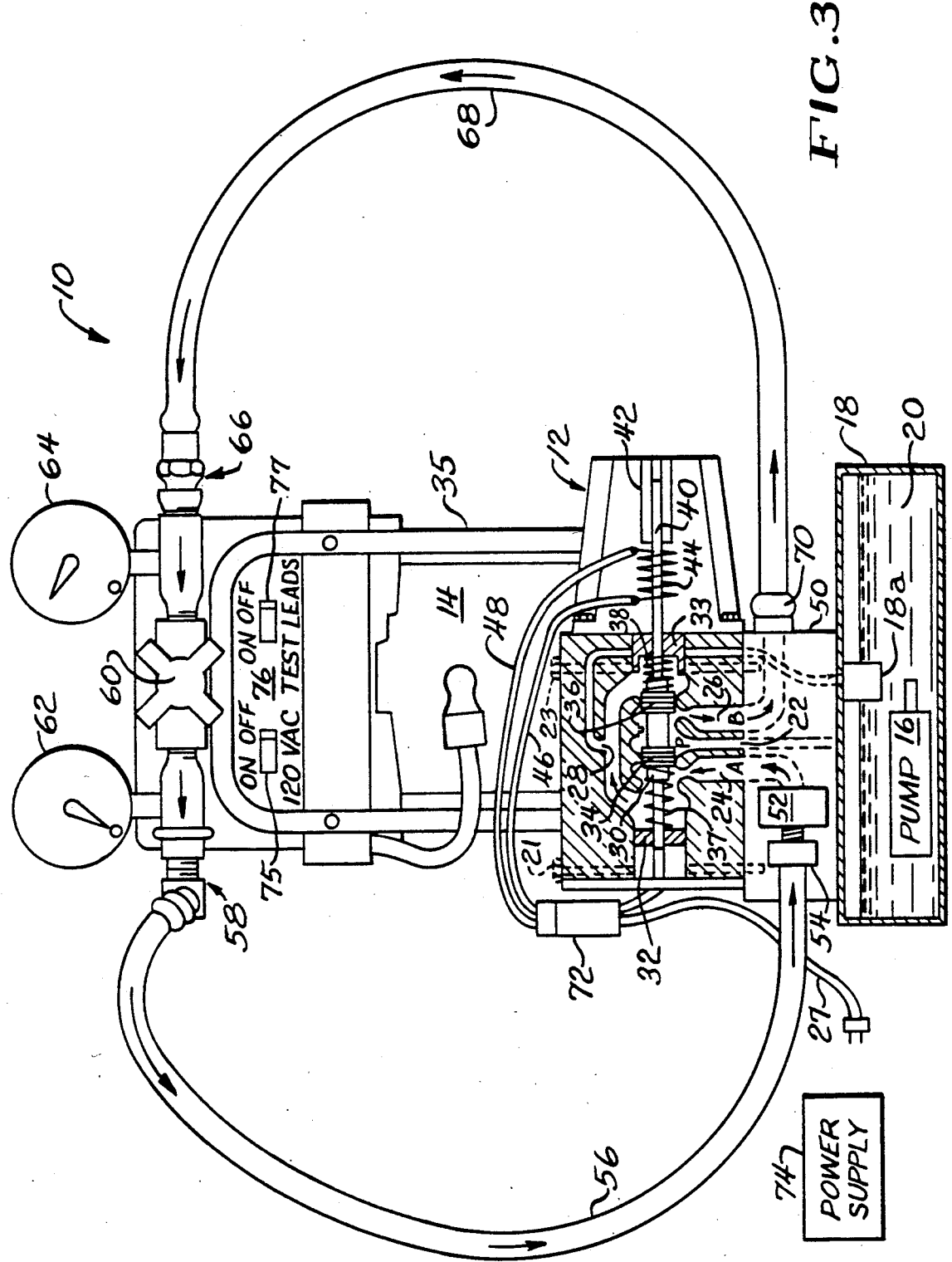
FIG. 3 is similar to FIG. 2 with the exception that the hydraulic valve is shown in the energized, or open, state.

Referring to FIG. 1, there is shown a block diagram of a hydraulic valve test device in accordance with the principles of the present invention. Additional details of the hydraulic valve test device are shown in the simplified schematic diagrams of FIGS. 2 and 3, where the hydraulic valve test device is identified as element number 10. The arrows in FIG. 2 show the direction of flow of a hydraulic fluid in the hydraulic valve test device 10 with the hydraulic valve closed, or de-energized. The arrows in FIG. 3 illustrate the direction of flow of hydraulic fluid in the hydraulic valve test device 10 with the hydraulic valve open, or energized.

As shown in the block diagram of FIG. 1, the hydraulic valve test device includes a power supply 74, such as an AC line source, coupled to an AC motor 14 as well as to a control panel 76. The control panel 76 is, in turn, coupled to the AC motor 14 for allowing an operator of the hydraulic valve test device 10 to enter appropriate control inputs. The AC motor 14 is coupled to and drives a pump 16 which is coupled to and pressurizes a closed hydraulic system 78. Positioned within the closed hydraulic system 78 is the hydraulic valve being tested. Also coupled to the closed hydraulic system 78 are a pair of hydraulic pressure gauges 62 and 64 which provide a visual indication of the operation of the hydraulic valve under test. An adjustable needle valve 60 also coupled to the closed hydraulic system 78 and positioned intermediate the pressure gauges 62 and 64 permits the hydraulic pressure at which the hydraulic valve is tested to be manually adjusted in accordance with the rating of the hydraulic valve. Details of the configuration and operation of the hydraulic valve test device of the present invention are provided in the following paragraphs with reference to the simplified, schematic diagrams of FIGS. 2 and 3.

The hydraulic valve test device 10 includes a hydraulic valve block, or manifold, 50 mounted to an upper portion of a reservoir 18 containing hydraulic fluid 20. The hydraulic valve block 50 is securely mounted to the hydraulic reservoir 18 by conventional means such as bolts, which are not shown in the figures for simplicity. A hydraulic valve 12 to be tested is securely attached to an upper portion of the hydraulic valve block 50 by means of mounting bolts 21 and 23 shown in dotted line form in the figures. An upper portion of the hydraulic valve block 50 may be provided with various arrays of apertures for mounting hydraulic valves of various sizes and configurations thereto for testing.

The hydraulic test valve device 10 further includes the AC motor 14 which may be connected by means of a power cord 27 to an AC power supply 74 such as a line voltage source. The AC motor 14 is energized by means of an ON/OFF switch 75 located on a control panel 76. The AC motor 14 is coupled to and operates a pump 16 located within the hydraulic reservoir 18 for providing hydraulic fluid under pressure via a P port 22 in the hydraulic valve block 50 to the hydraulic valve 12 under test. The hydraulic valve block 50 also includes A and B ports 24 and 26 for directing the hydraulic fluid into a closed hydraulic system as shown by the direction of the arrows in FIGS. 2 and 3.

The hydraulic valve 12 further includes a plunger 30 linearly displaceable along its longitudinal axis within the hydraulic valve. Positioned in a spaced manner along the length of the plunger 30 are first and second seals 34 and 36. Extending from respective ends of the plunger 30 for maintaining it in position within the hydraulic valve 12 are first and second support shafts 40 and 41. The first support shaft 40 is positioned within and supported by a first end guide/stop 32. The second support shaft 41 is positioned within and supported by a shaft support member 42. First and second compression springs 37 and 38 positioned adjacent to respective ends of the plunger 30 urge the plunger in opposing directions to maintain the plunger in a fixed position when both energized and de-energized. The first end guide/stop 32 and a second end guide/stop 33 respectively engage and maintain in position the first and second compression springs 37 and 38. The second support shaft 41 also forms the core of a solenoid which also includes a coil 44. The coil 44 is coupled to an electrical connector 72 by means of first and second leads 46 and 48. The electrical connector 72 is coupled to the AC power supply 74 via the power cord 27 for energizing the coil 44 via an ON/OFF TEST LEADS switch 77 which is also coupled in circuit with the coil, although this is not shown in the figures for simplicity. As shown in FIG. 2, the plunger 30 and second support shaft 41 are positioned to the left when the hydraulic valve 12 is closed, or de-energized. When the coil 44 is energized by the power supply 74, the change in current in the coil causes a change in its magnetic field causing the rightward displacement of the second support shaft 41 and plunger 30 to the position shown in FIG. 3. In this position, the hydraulic valve 12 is open, or energized.

As shown in FIG. 2, with the hydraulic valve 12 in the closed position, hydraulic fluid under pressure flows from the P port 22 to the A port 24 and thence to an A port hose 56 via an access port 52 and a connector 54. The A port hose 56 directs the hydraulic fluid to an adjustable needle valve 60 via a connector 58. An A port pressure gauge 62 is connected to the hydraulic line between the connector 58 and the needle valve 60.

To the other end of the needle valve 60 is coupled a B port hose 68 via a connector 66. The B port hose 68 is coupled to the B port 26 of the hydraulic valve block 50 by means of a connector 70. With the hydraulic valve 12 closed, the circulating hydraulic fluid flows via the B port to a return port and line 28 within the valve to a reservoir inlet 18a in the hydraulic reservoir 18. A B port pressure gauge 64 is coupled to the closed hydraulic system between the needle valve 60 and the connector 66 coupled to the B port hose 68. A handle 35 is provided to facilitate moving the hydraulic valve test device 10, which is portable.

The procedure for operating the hydraulic valve test device 10 is as follows. The hydraulic valve 12 to be tested is mounted to the hydraulic valve block 50 via bolts 21, 23 and the coil 44 is coupled to the 110 volt test leads 46 and 48. The needle valve 60 is fully opened prior to starting operation of the hydraulic pump 16. After starting the hydraulic pump 16 and causing the hydraulic fluid to flow in the direction of the arrows in FIG. 2, the needle valve 60 is closed until the pressure shown on the A port pressure gauge 62 reaches the specified operating pressure for the hydraulic valve being tested. The pressure reading on the B port pressure gauge 64 will then be zero p.s.i. With the hydraulic valve 12 de-energized, the hydraulic fluid will be pumped from the A port 24 of the hydraulic valve block 50 through the needle valve 60 to the B port 26 and then into the hydraulic reservoir 18 via the return port and line 28 and reservoir inlet 18a. The ON/OFF TEST LEADS switch 77 is in the OFF position when the hydraulic valve 12 is de-energized.

Actuation of the hydraulic valve 12 by moving the ON/OFF TEST LEADS switch 77 to the ON position, causes the rightward displacement of the hydraulic valve's plunger 30 to the position shown in FIG. 3. With the plunger 30 in this position, the hydraulic valve 12 is open, or energized. With the hydraulic valve 12 energized by applying 110 VAC to its coil 44, the direction of flow of the hydraulic fluid in the closed hydraulic system is reversed as shown by the direction of the arrows in FIG. 3. With the hydraulic valve 12 open, the pressure indicated on the A port pressure gauge 62 will drop to zero p.s.i., while the pressure indicated on the B port pressure gauge 64 will increase to the designated rating of the hydraulic valve. With the direction of flow reversed, hydraulic fluid will be pumped from the B port of the hydraulic valve block 50 through the needle valve 60 to its A port and then into the hydraulic reservoir 18 via the return port and line 28 and reservoir inlet 18a. The hydraulic valve test device 10 of the present invention thus strokes a hydraulic valve under normal operating pressure to ensure operability of the valve when installed in a hydraulic control system. In one embodiment of the present invention, a hydraulic pump capable of providing 10,000 p.s.i. is used for applying pressures on the order of 2,500 p.s.i. for testing a Vickers hydraulic valve rated at 1,500 p.s.i. such as used in conventional and nuclear power generating stations. High-pressure testing of the hydraulic valve increases the likelihood of proper operation at normal operating pressures.

There has thus been shown a hydraulic valve test device which includes a hydraulic power pack providing hydraulic fluid under pressure to a hydraulic valve being tested. The hydraulic valve is connected to a closed hydraulic system pressurized by the power pack which further includes electrical supply and control means for opening and closing the hydraulic valve. Two pressure gauges separated by an adjustable needle valve in the closed hydraulic system allow for monitoring the hydraulic valve switching pressure in both the open and closed configurations prior to installation of the hydraulic valve in a hydraulic control system.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for testing an electrically energized hydraulic valve, wherein the hydraulic valve is open when energized and closed when de-energized, said apparatus comprising:
    a closed hydraulic system coupled to the hydraulic valve and including first and second ports and a pump for maintaining a hydraulic fluid under pressure;
    valve means coupling said first and second ports for providing a pressure drop in the hydraulic fluid between said ports;
    first and second hydraulic pressure gauges coupled between the first port and said valve means and between said second port and said valve means, respectively, wherein hydraulic fluid flows in a first direction and said first pressure gauge indicates the hydraulic fluid pressure applied to the hydraulic valve when the hydraulic valve is de-energized and said second gauge indicates zero pressure; and
    electrical means coupled to the hydraulic valve for energizing the hydraulic valve whereupon the hydraulic fluid flows in a second direction, wherein said first and second directions are opposed and said first pressure gauge indicates zero pressure and said second pressure gauge indicates the hydraulic fluid pressure applied to the hydraulic valve.

2. The apparatus of claim 1 wherein said closed hydraulic system further includes a reservoir for storing the hydraulic fluid.

3. The apparatus of claim 2 further comprising a return port and line from the hydraulic valve to said reservoir.

4. The apparatus of claim 2 further comprising an electric motor coupled to said pump for driving said pump.

5. The apparatus of claim 4 further comprising means for turning said motor ON and OFF and for energizing and de-energizing the hydraulic valve.

6. The apparatus of claim 1 wherein said valve means is adjustable for controlling the pressure applied to the hydraulic valve.

7. The apparatus of claim 6 wherein said valve means comprises a manually operated needle valve.

8. The apparatus of claim 1 further comprising a valve block coupling the hydraulic valve to said reservoir and adapted for attaching hydraulic valves of different sizes and configurations to the apparatus for testing.

9. Apparatus for testing a hydraulic valve when closed and opened, said apparatus comprising:
    a reservoir containing hydraulic fluid;
    pump means coupled to said reservoir for providing said hydraulic fluid under pressure;
    valve block means connected to the valve and to said reservoir for providing hydraulic fluid under pressure to the valve and receiving hydraulic fluid from the valve;
    valve actuation means coupled to the valve for closing and opening the valve;
    first and second hoses coupled to said valve block means for receiving hydraulic fluid when the valve is closed and open, respectively, wherein the hydraulic fluid flow in said hoses in a first direction when the valve is open and in a second direction when the valve is closed and wherein said first and second directions are opposed;
    pressure control means coupling said first and second hoses for regulating the hydraulic pressure applied to the valve; and
    first and second hydraulic indicator means respectively coupled to said first and second hoses for measuring and displaying the hydraulic pressure when the valve is closed and open, respectively.

10. The apparatus of claim 9 wherein the hydraulic valve is actuated by a solenoid and said valve actuation means includes an electrical power supply.

11. The apparatus of claim 9 wherein a first and second indicator means respectively include first and second pressure gauges.

12. The apparatus of claim 11 wherein said pressure control means includes a needle valve disposed intermediate said first and second pressure gauges.

* * * * *

UNITED STATES PATENT AND TRADEMARK OFFICE
CERTIFICATE OF CORRECTION

PATENT NO. : 5,048,329
DATED : September 17, 1991
INVENTOR(S) : Guiseppe Marchini It is certified that error appears in the above-identified patent and that said Letters Patent is hereby corrected as shown below:

Column 1    Line 6:     Insert the word --is-- between the words "and" and "particularly".

Column 6    Line 39:    "flow" should be --flows--.

Signed and Sealed this

Twenty-second Day of December, 1992

Attest:

DOUGLAS B. COMER

Attesting Officer    Acting Commissioner of Patents and Trademarks